(12) United States Patent
Shimazawa (10) Patent No.: US 11,509,609 B2
(45) Date of Patent: Nov. 22, 2022

(54) CHAT SYSTEM, CHAT CONTROL APPARATUS AND CHAT PROGRAM

(71) Applicant: WingArc1st Inc., Tokyo (JP)

(72) Inventor: Ko Shimazawa, Tokyo (JP)

(73) Assignee: WINGARC1ST INC., Tokyo (JP)

(*) Notice: Subject to any disclaimer, the term of this patent is extended or adjusted under 35 U.S.C. 154(b) by 239 days.

(21) Appl. No.: 16/951,019

(22) Filed: Nov. 18, 2020

(65) Prior Publication Data

US 2021/0152499 A1    May 20, 2021

(30) Foreign Application Priority Data

Nov. 18, 2019 (JP) .............................. JP2019-207678

(51) Int. Cl.
  *G06F 15/16* (2006.01)
  *H04L 51/04* (2022.01)
  *H04L 51/42* (2022.01)

(52) U.S. Cl.
  CPC .............. *H04L 51/04* (2013.01); *H04L 51/42* (2022.05)

(58) Field of Classification Search
  CPC .......... H04L 51/04; H04L 51/42; H04L 51/02
  See application file for complete search history.

(56) References Cited

U.S. PATENT DOCUMENTS

| 6,647,363 B2 | 11/2003 | Claassen |
| 2003/0125926 A1 | 7/2003 | Claassen |
| 2019/0036850 A1* | 1/2019 | Kushwaha ............ H04L 51/043 |
| 2022/0130387 A1* | 4/2022 | Danila .................... G10L 15/30 |

FOREIGN PATENT DOCUMENTS

| JP | 2002-527829 A | 8/2002 |
| JP | 2018-159729 A | 10/2018 |
| WO | WO 2017/200072 A1 | 11/2017 |

* cited by examiner

*Primary Examiner* — John B Walsh
(74) *Attorney, Agent, or Firm* — Polsinelli PC (57) ABSTRACT

In a chat system configured to perform a conversation between a user and a chat control apparatus, a user terminal includes a display control unit that displays response information returned from the chat control apparatus, a post information generation unit that automatically generates new post information using a designated text when an operation is performed to designate a text of displayed response information, and a post information transmission unit that automatically transmits generated post information to the chat control apparatus. When the user performs an operation of designating response information displayed on the user terminal, new post information is automatically generated using a text of the designated response information and transmitted to the chat control apparatus. In this way, the conversation is continued.

22 Claims, 7 Drawing Sheets

CHAT SYSTEM, CHAT CONTROL APPARATUS AND CHAT PROGRAM

BACKGROUND OF THE INVENTION

Field of the Invention

The present invention relates to a chat system, a chat control apparatus, and a chat program, and is particularly suitable for use in a chat system that executes a conversation between a human and a computer.

Description of the Related Art

In recent years, an automatic dialogue program, a so-called chatbot, that combines "chat", which is a real-time communication mechanism for mainly exchanging texts in both directions, and "robot", which has a built-in program for automatically executing certain tasks on behalf of humans, has been developed and widely used. In contrast to a chat where humans talk to each other, in the chatbot, a human has a conversation with a computer incorporating artificial intelligence.

The chatbot is also used for many business chats which are used for various business operations. Business chat is mainly intended to facilitate communication in a company by using chat instead of e-mail, and has functions such as business task management, schedule management, efficient information sharing, workflow management, and automatic document creation in addition to business communication by chat.

Note that in a conversation system that executes a human-computer conversation, a technology has been known in which a computer selects one of a plurality of preset scenarios to execute a conversation with a user (for example, see JP-T-2002-527829 (the term "JP-T" as used herein means a published Japanese translation of a PCT patent application), JP-A-2018-159729, and WO 17/200072). JP-T-2002-527829 discloses determining an inquiry item from utterance content of a user, searching for information corresponding to the inquiry item, and then responding with search result information according to one scenario selected from predetermined presentation scenarios. In addition, JP-A-2018-159729 and WO 17/200072 disclose a configuration in which a scenario corresponding to utterance content of a user is selected from pre-registered scenarios and a conversation is continued.

However, the conversation system described in JP-T-2002-527829, JP-A-2018-159729, and WO 17/200072 provides a mechanism in which a computer selects a scenario suitable for utterance content with respect to one utterance of the user and returns one response. Therefore, in order for the user and the computer to continue the conversation, the user needs to speak each time. A chatbot mainly exchanging texts in both directions is basically similar to JP-T-2002-527829, JP-A-2018-159729, and WO 17/200072. In order for the user and the chatbot to continue a conversation, the user needs to input text to a computer each time. For this reason, there is a problem of causing inconvenience felt by the user inputting texts one by one.

SUMMARY OF THE INVENTION

The invention has been made to solve such a problem, and an object of the invention is to avoid inconvenience felt by a user who needs to input texts one by one each time a conversation reciprocating once is performed, and make it easier to chat in a chat system that executes a conversation between a human and a computer.

To solve the above-mentioned problem, in the invention, in a chat system including a user terminal used by a user and a chat control apparatus that controls execution of a conversation, and executing a conversation between the user and the chat control apparatus, the chat control apparatus selects a conversation flow suitable for content of a text of post information from a plurality of conversation flows registered in advance based on post information of a text transmitted from the user terminal, generates response information of the text according to the selected conversation flow, and returns the generated response information to the user terminal. On the user terminal, the response information returned from the chat control apparatus is displayed, and when an operation is performed to designate a text of the displayed response information, new post information is generated using the designated text and transmitted to the chat control apparatus.

According to the invention configured in this way, in the chat system that executes a conversation between the user and the chat control apparatus, when the user performs an operation of designating the response information returned from the chat control apparatus and displayed on the user terminal, new post information is generated using a text of the designated response information and transmitted to the chat control apparatus, so that the conversation is continued. Therefore, it is possible to avoid inconvenience felt by the user who needs to input all texts of post information one by one each time a conversation reciprocating once is performed between the user and the chat control apparatus, and make it easier to chat.

DETAILED DESCRIPTION OF THE INVENTION

Figure 1:
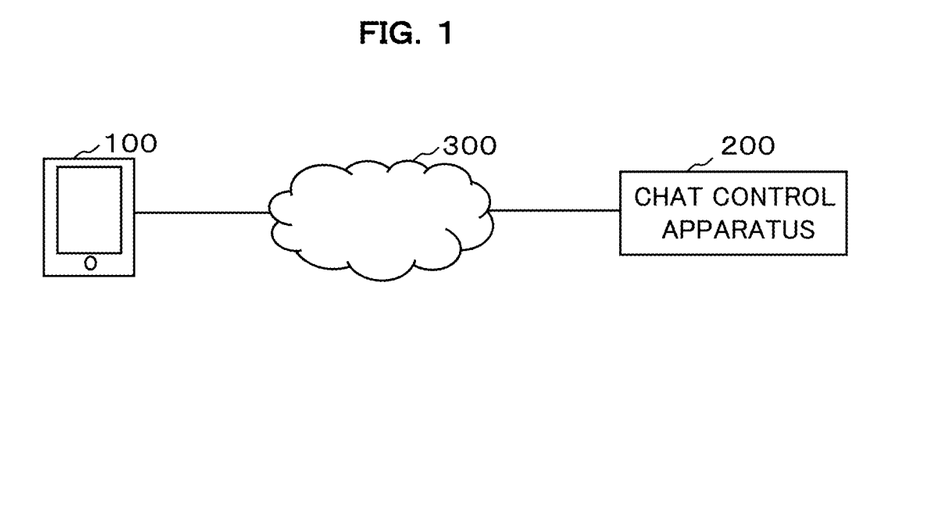
FIG. 1 is a diagram illustrating an overall configuration example of a chat system according to an embodiment.

Hereinafter, an embodiment of the invention will be described with reference to the drawings. FIG. 1 is a diagram illustrating an overall configuration example of a chat system according to the present embodiment. As illustrated in FIG. 1, the chat system of the present embodiment includes a user terminal 100 used by a user and a chat control apparatus 200 for controlling execution of a conversation, and a conversation is executed between the user and a computer (chat control apparatus 200). The user terminal 100 and the chat control apparatus 200 are configured to be connectable via a wide area network 300 such as the Internet or a mobile phone network.

For example, the user terminal 100 includes a mobile terminal such as a smartphone, a tablet terminal, or a notebook personal computer, or a stationary personal computer. An application program (hereinafter referred to as a chat application) for using a chat function provided by the chat control apparatus 200 is installed in the user terminal 100. The chat control apparatus 200 includes a server device that executes a process according to a request from the user terminal 100 and returns a process result.

Figure 2:
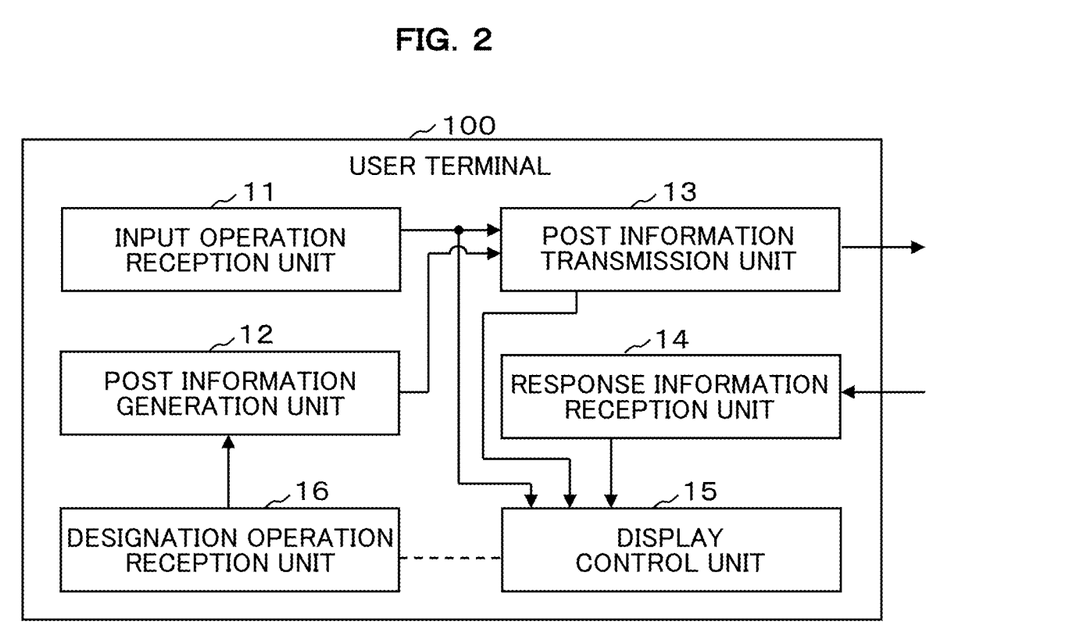
FIG. 2 is a block diagram illustrating a functional configuration example of a user terminal according to the embodiment.
Figure 3:
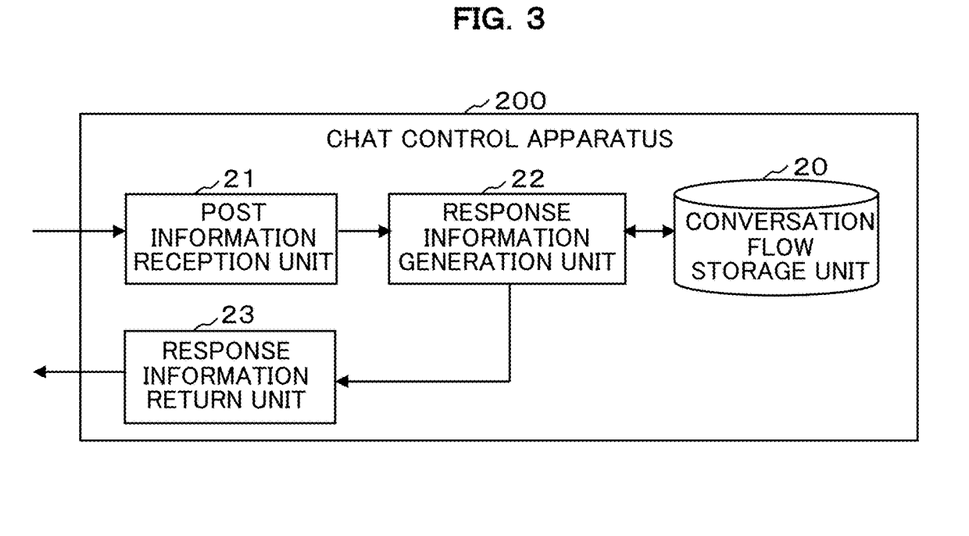
FIG. 3 is a block diagram illustrating a functional configuration example of a chat control apparatus according to the embodiment.

FIG. 2 is a block diagram illustrating a functional configuration example of the user terminal 100 according to the present embodiment. FIG. 3 is a block diagram illustrating a functional configuration example of the chat control apparatus 200 according to the present embodiment. As illustrated in FIG. 2, the user terminal 100 of the present embodiment includes an input operation reception unit 11, a post information generation unit 12, a post information transmission unit 13, a response information reception unit 14, a display control unit 15, and a designation operation reception unit 16 as functional configurations. Further, as illustrated in FIG. 3, the chat control apparatus 200 of the present embodiment includes a post information reception unit 21, a response information generation unit 22, and a response information return unit 23 as functional configurations. Further, the chat control apparatus 200 includes a conversation flow storage unit 20 as a storage medium.

Each of the functional blocks 11 to 16 of the user terminal 100 can be configured by any of hardware, a digital signal processor (DSP), and software. For example, in the case of being configured by software, each of the functional blocks 11 to 16 actually includes a CPU, a RAM, a ROM, etc., of a computer, and is implemented by operating a chat program (chat application) stored in a recording medium such as a RAM, a ROM, a hard disk, or a semiconductor memory.

Similarly, each of the functional blocks 21 to 23 of the chat control apparatus 200 can be configured by any of hardware, a DSP, and software. For example, in the case of being configured by software, each of the functional blocks 21 to 23 actually includes a CPU, a RAM, a ROM, etc., of a computer, and is implemented by operating a chat control program stored in a recording medium such as a RAM, a ROM, a hard disk, or a semiconductor memory.

The conversation flow storage unit 20 of the chat control apparatus 200 stores a plurality of types of data related to a conversation flow that defines a series of processes for generating response information by performing a predetermined process based on post information. The conversation flow is a script that defines a series of processing flows for performing a predetermined process and outputting a text of response information when input of text based on post information is given. The conversation flow storage unit 20 stores data related to a plurality of types of conversation flows designated for any combination of a plurality of types of input information and a plurality of types of output information.

The conversation flow may be a non-branched flow in which one piece of output information (text of response information) is obtained for one piece of input information (part or all of text of post information). Further, the conversation flow may be a branched flow in which any one of a plurality of pieces of output information is obtained for one piece of input information, or a branched flow in which one piece of output information is obtained for any one of a plurality of pieces of input information.

For example, the conversation flow may perform a process for generating a message such as a reply sentence for post information. Alternatively, the conversation flow may execute a process of one or more predetermined applications for post information. The predetermined application is optional. For example, it is possible to use an application that accesses a predetermined database and acquires information according to post information, an application that performs statistical processing using information acquired from a database, etc.

The plurality of types of conversation flows is registered and stored in advance in the conversation flow storage unit 20. Further, a person in charge of operating the chat system of the present embodiment, or the user of the user terminal 100, etc. may generate an arbitrary conversation flow, and register data of the generated conversation flow in the conversation flow storage unit 20 so that the data is stored.

Figure 4:
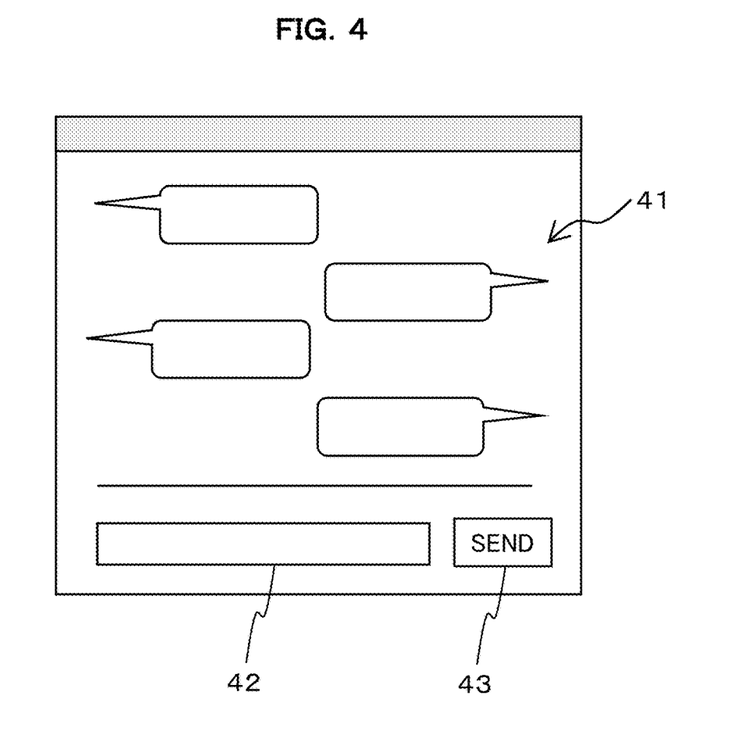
FIG. 4 is a diagram briefly illustrating an example of a chat screen displayed on the user terminal by a display control unit of the embodiment.

The input operation reception unit 11 of the user terminal 100 receives an operation of inputting text of post information to a predetermined input box. FIG. 4 is a diagram briefly illustrating an example of a chat screen including a predetermined input box. This chat screen is displayed on a display of the user terminal 100 under the control of the display control unit 15. As illustrated in FIG. 4, the chat screen includes a conversation display area 41 that displays the post information from the user and the response information from the computer in a timeline format, an input box 42 for inputting text of the post information, and a send button 43 with which the user instructs to transmit the post information.

For example, the user can input desired text as post information to the input box 42 by operating a touch panel or a keyboard of the user terminal 100. The input operation reception unit 11 receives an input operation for the input box 42 and inputs the text of the post information.

The post information generation unit 12 automatically generates subsequent post information using response information sent from the chat control apparatus 200. Specific content related to automatic generation of this post information will be described later.

The post information transmission unit 13 transmits post information input based on an operation received by the input operation reception unit 11 or post information generated by the post information generation unit 12 to the chat control apparatus 200. In a case where the input operation reception unit 11 receives an operation of inputting text to the input box 42, the post information transmission unit 13 waits for a user operation on the send button 43 while post information of the text is input to the input box 42, and transmits the post information input to the input box 42 to the chat control apparatus 200 when the user operation on the send button 43 is performed.

On the other hand, in a case where post information is automatically generated by the post information generation unit 12, the post information transmission unit 13 automatically transmits the post information generated by the post information generation unit 12 to the chat control apparatus 200 without waiting for the user operation on the send button 43. That is, immediately after the post information is generated by the post information generation unit 12, the post information transmission unit 13 automatically transmits the post information to the chat control apparatus 200. This automatic transmission may be performed by a process of automatically operating the send button 43 immediately after the post information generated by the post information generation unit 12 is automatically input to the input box 42.

The post information reception unit 21 of the chat control apparatus 200 receives post information of text transmitted from the user terminal 100. The response information generation unit 22 selects a conversation flow suitable for content of the text of the post information from a plurality of conversation flows registered in advance in the conversation flow storage unit 20 based on the post information received by the post information reception unit 21, and generates response information of the text according to the selected conversation flow.

The conversation flow suitable for the content of the text of the post information refers to a conversation flow in which the content of the text of the post information received by the post information reception unit 21 coincides with or corresponds to a combination of input information and output information among a plurality of types of conversation flows including an arbitrary combination of the input information and the output information. Here, the conversation flow in which the content of the text of the post information "coincides with" the combination of the input information and the output information refers to a conversation flow in which a part of the text of the post information is relevant to the input information and another part is relevant to the output information. In addition, the conversation flow in which the content of the text of the post information "corresponds to" the combination of the input information and the output information refers to a conversation flow in which a part or all of the text of the post information is relevant to either the input information or the output information.

For example, in a case where the content of the text of the post information received by the post information reception unit 21 is "XX of ○○)", a conversation flow in which text of a part "○○" is relevant to the input information of the combination and text of a part "XX" is relevant to the output information is equivalent to a conversation flow suitable for the content of the text of the received post information (conversation flow coinciding with the combination of the input information and the output information), which is equivalent to a conversation flow that defines a series of processes for generating response information indicated by text "XX" by performing a predetermined process based on post information of text "○○".

Further, in a case where the content of the text of the post information received by the post information reception unit 21 is "○○", a conversation flow in which text of a part "○○" is relevant to the input information or the output information is equivalent to a conversation flow suitable for the content of the text of the received post information (conversation flow corresponding to the combination of the input information and the output information), which is equivalent to a conversation flow for generating some response information by performing a predetermined process based on post information of text "○○" or a conversation flow for generating response information indicated by text "○○" by performing a predetermined process based on post information.

When post information is received by the post information reception unit 21, one conversation flow suitable for the post information is designated by the response information generation unit 22 (any one branch is specified in the case of a branched conversation flow), and response information of text is generated according to the designated conversation flow.

The response information return unit 23 returns, to the user terminal 100, the response information generated by the response information generation unit 22. The response information reception unit 14 of the user terminal 100 receives the response information returned from the chat control apparatus 200.

The display control unit 15 displays the post information transmitted to the chat control apparatus 200 and the response information returned from the chat control apparatus 200. That is, on the chat screen illustrated in FIG. 4, the display control unit 15 causes the conversation display area 41 to display post information transmitted to the chat control apparatus 200 (post information from the user) and response information returned from the chat control apparatus 200 (response information from the computer) in a timeline format. Further, the display control unit 15 display an input text which is received by the input operation reception unit 11, in the input box 42.

The designation operation reception unit 16 receives an operation of designating text of response information displayed on the conversation display area 41 of the chat screen by the display control unit 15. For example, when the chat screen is displayed on a display having a touch panel, the designation operation reception unit 16 receives a tap operation on a part where the text of the response information is displayed.

The post information generation unit 12 generates new post information using text designated based on an operation received by the designation operation reception unit 16. For example, the post information generation unit 12 adds a flow-related text related to a conversation flow that can be suitable for content of text designated by the designation operation reception unit 16 among the plurality of conversation flows registered in the conversation flow storage unit 20 to text designated by the designation operation reception unit 16, thereby automatically generating new post information by combined text.

The conversation flow that can be suitable for the content of the designated text refers to a conversation flow in which content of text designated by the designation operation reception unit 16 coincides with content of input information among a plurality of types of conversation flows including an arbitrary combination of the input information and output information. Further, the flow-related text related to the conversation flow refers to text representing content of output information (response information) of the conversation flow. This flow-related text is preset as incidental information for each of a plurality of conversation flows.

For example, the post information generation unit 12 adds, to text "○○" designated by the designation operation reception unit 16, a flow-related text "XX" related to a conversation flow that can be suitable for content of the designated text, thereby automatically generating new post information of combined text "XX of ○○". When the post information transmission unit 13 transmits the post information of the combined text "XX of ○○" automatically generated in this way to the chat control apparatus 200, as described above, a conversation flow coinciding with or corresponding to content of the text "XX of ○○)" is selected by the response information generation unit 22 and executed, and response information indicated by "XX" (related to "○○") is generated.

For example, the conversation flow that can be suitable for the content of the text designated by the designation operation reception unit 16 is recognized by an inquiry to the chat control device 200 made by the post information generation unit 12. That is, the post information generation unit 12 transmits the text designated by the designation operation reception unit 16 to the chat control apparatus 200, and inquires about a conversation flow that can be suitable for the text. The chat control apparatus 200 searches the conversation flow storage unit 20 for a conversation flow in which content of text about which inquiry has been received coincides with content of input information, and returns, to the user terminal 100, a flow-related text set as incidental information in the searched conversation flow. The post information generation unit 12 adds the flow-related text returned from the chat control apparatus 200 in response to inquiry to text designated by the designation operation reception unit 16, thereby automatically generating new post information by combined text.

It is possible to recognize a conversation flow that can be suitable for content of text designated by the designation operation reception unit 16 without inquiring of the chat control apparatus 200. For example, for each of the plurality of conversation flows stored in the conversation flow storage unit 20, a combination of content of input information of a conversation flow and a flow-related text is generated as search data, and the search data is transmitted from the chat control apparatus 200 to the user terminal 100 and stored in the user terminal 100 in advance. The post information generation unit 12 searches for the search data based on text designated by the designation operation reception unit 16, thereby acquiring a flow-related text, and adds the flow-related text acquired by the search to the text designated by the designation operation reception unit 16, thereby automatically generating new post information by combined text.

Note that for example, transmission of the search data from the chat control apparatus 200 to the user terminal 100 may be executed by transmitting a search data acquisition request from a chat application to the chat control apparatus 200 each time the chat application is activated in the user terminal 100. Alternatively, the search data acquisition request may be transmitted when there is a user operation on the chat application. Alternatively, regardless of whether or not the chat application is activated, the search data acquisition request may be periodically transmitted from the chat application to the chat control apparatus 200 as a background process. A method in which the user terminal 100 acquires the search data from the chat control apparatus 200 is not limited to the example given here, and other methods can be adopted.

Here, when there is only one conversation flow that can be suitable for the content of the text designated by the designation operation reception unit 16, the post information generation unit 12 automatically generates post information using a flow-related text related to the conversation flow. On the other hand, when there is a plurality of conversation flows that can be suitable for the content of the text designated by the designation operation reception unit 16, for example, the post information generation unit 12 automatically selects any one of the plurality of conversation flows, and automatically generates post information using a flow-related text related to the one automatically selected conversation flow. As described above, in the case of inquiring of the chat control apparatus 200 about a conversation flow that can be suitable for content of a designated text, the post information generation unit 12 may select any one from a plurality of flow-related texts returned from the chat control apparatus 200. Selection of the flow-related text in this case is equivalent to selection of a conversation flow. A conversation flow may be selected randomly or successively according to a predetermined order.

Figure 5:
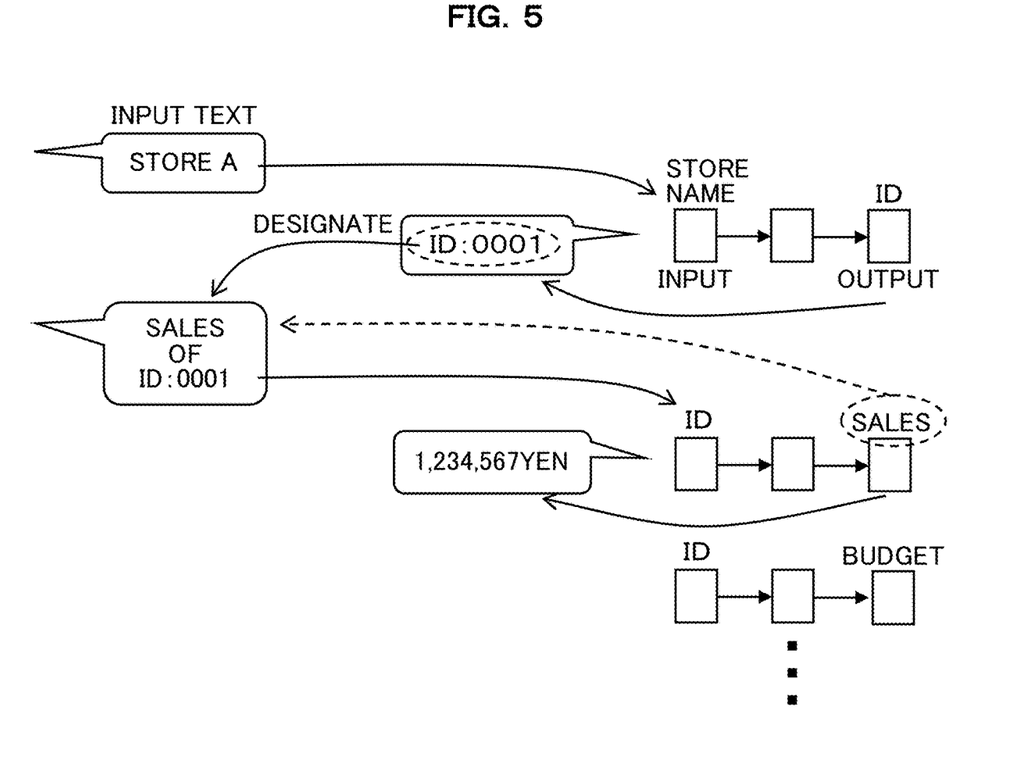
FIG. 5 is a diagram schematically illustrating an operation example of the chat system according to the embodiment.

FIG. 5 is a diagram schematically illustrating an operation example of the chat system according to the embodiment configured as described above. At the start of a conversation, the user inputs text of post information to the input box 42 of the chat screen, and operates the send button 43 to transmit the post information to the chat control apparatus 200. In the example of FIG. 5, a name of a store A is input to the input box 42, and this name is transmitted to the chat control apparatus 200 as post information. The post information (name of the store A) transmitted to the chat control apparatus 200 is displayed on the conversation display area 41 of the chat screen by the display control unit 15.

In the chat control apparatus 200, the response information generation unit 22 selects a conversation flow suitable for content of the text of the post information (name of the store A) from a plurality of conversation flows registered in advance in the conversation flow storage unit based on post information received by the post information reception unit 21, and generates response information of the text according to the selected conversation flow. Then, the response information return unit 23 returns, to the user terminal 100, the response information generated by the response information generation unit 22.

In the example of FIG. 5, as a conversation flow suitable for the content of the text of the post information (name of store A), a conversation flow in which a store name is set as input information and a store ID is set as output information is selected and executed, and a store ID (ID: 0001) is returns to the user terminal 100 as response information. Here, there is only one conversation flow that performs a predetermined process using a store name as input information, this one conversation flow is selected, and a store ID corresponding to the store name is generated as response information. For example, in this conversation flow, a series of processing flows is defined to search a predetermined database based on a store name and acquire a store ID stored corresponding to the store name.

The response information (ID: 0001) returned to the user terminal 100 is displayed on the conversation display area 41 of the chat screen by the display control unit 15. Then, when the user performs an operation to designate the response information, this designation operation is detected by the designation operation reception unit 16, and new post information is generated by the post information generation unit 12 using text of the designated response information and a flow-related text related to a conversation flow that can be suitable for content of the designated text.

In the example of FIG. 5, as a conversation flow that can be suitable for content (ID: 0001) of a designated text (conversation flow in which a designated store ID is set as input information), there are a conversation flow that outputs "sales" of a store corresponding to the store ID as response information, a conversation flow that outputs "budget" of a store corresponding to the store ID as response information, etc. Here, the conversation flow that outputs "sales" as response information is automatically selected among these conversation flows, a flow-related text "sales" representing content of output information (response information) of the conversation flow is added to the content (ID: 0001) of the text designated by the user, and new post information by a combined text "sales of ID: 0001" is automatically generated.

The new post information (text "sales of ID: 0001") automatically generated by the response information generation unit 22 is immediately transmitted to the chat control apparatus 200 by the post information transmission unit 13 without waiting for an operation on the send button 43 by the user, and displayed on the conversation display area 41 by the display control unit 15. In the chat control apparatus 200, the response information generation unit 22 selects a conversation flow suitable for content (sales of ID: 0001) of a text of post information from a plurality of conversation flows registered in advance in the conversation flow storage unit 20 based on post information received by the post information reception unit 21, and generates response information of the text according to the selected conversation flow. Then, the response information return unit 23 returns, to the user terminal 100, the response information generated by the response information generation unit 22.

In the example of FIG. 5, a conversation flow in which a store ID is set as input information and sales is set as output information is selected and executed as a conversation flow suitable for the content (sales of ID: 0001) of the text of the post information, and a text "1,234,567 yen" is returned to the user terminal 100 as response information. For example, a series of processing flows for searching a predetermined database based on a store ID and acquiring or calculating sales information of a store corresponding to the store ID is defined in this conversation flow. The response information of the text "1,234,567 yen" returned to the user terminal 100 is displayed on the conversation display area 41 of the chat screen by the display control unit 15.

Figure 6:
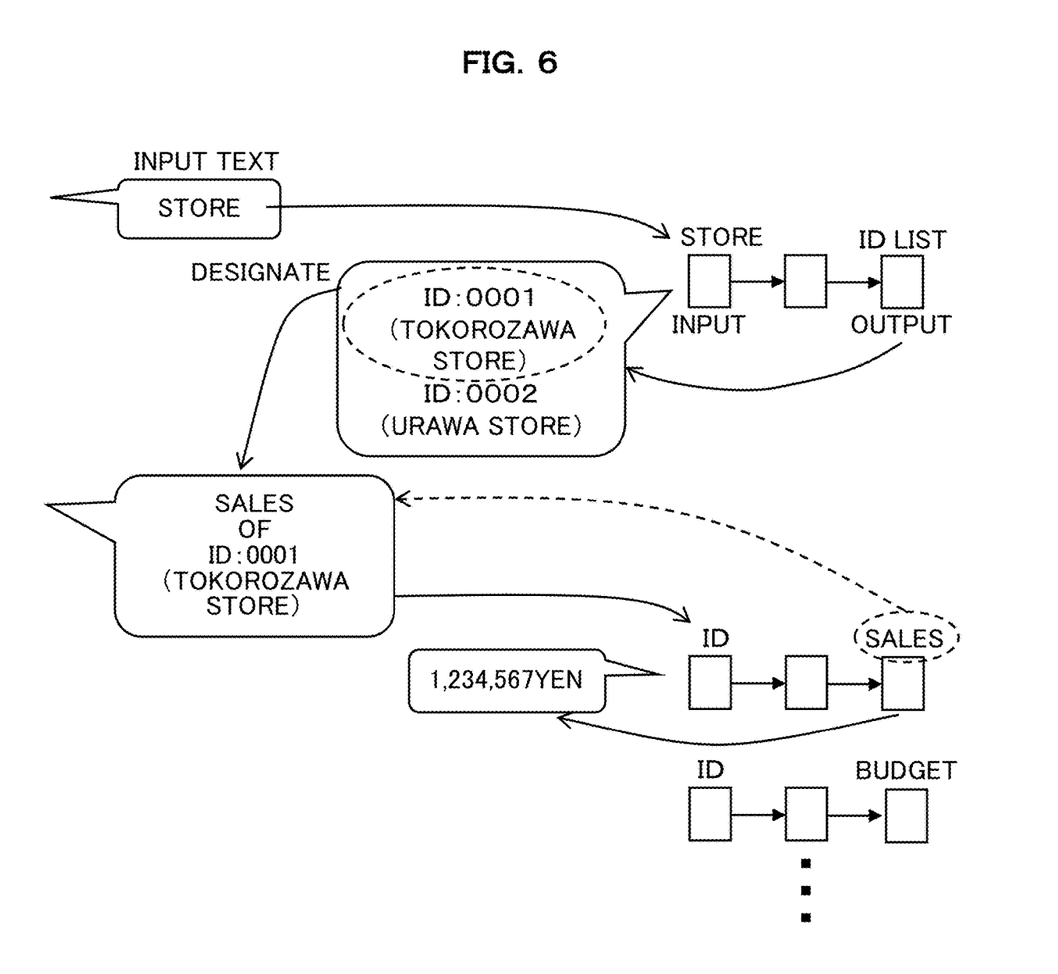
FIG. 6 is a diagram schematically illustrating an operation example of the chat system according to the embodiment.

FIG. 6 is a diagram schematically illustrating another operation example of the chat system according to the present embodiment. In the operation example illustrated in FIG. 6, at the start of a conversation, the user inputs a text "store" to the input box 42 and transmits this text as post information to the chat control apparatus 200. In response thereto, the response information generation unit of the chat control apparatus 200 generates response information of the text including two or more options that can be designated by the user according to a conversation flow selected as a conversation flow suitable for content of post information from a plurality of conversation flows stored in the conversation flow storage unit 20.

That is, the response information generation unit 22 selects and executes a conversation flow in which a text "store" is set as input information and a store ID list is set as output information as a conversation flow suitable for content of a text of post information, thereby generating a plurality of store IDs (ID: 0001 (Tokorozawa store) and ID: 0002 (Urawa store)) as response information. Note that though response information including only a store ID as a text may be generated, response information of a text including another store name of the store ID in parentheses is generated so that the user can easily select one.

The response information of the store ID list generated by the response information generation unit 22 (response information of a text including two or more options) is returned to the user terminal 100 by the response information return unit 23, and displayed on the conversation display area 41 of the chat screen by the display control unit 15. The user can select and designate a desired store ID from the store ID list (options) displayed as response information on the conversation display area 41. In the example of FIG. 6, the user designates "ID: 0001 (Tokorozawa store)".

The post information generation unit 12 adds a flow-related text related to a conversation flow that can be suitable for content of a text designated by the designation operation reception unit 16 to a text designated from options by the designation operation reception unit 16, thereby automatically generating new post information by a combined text.

In the example of FIG. 6, as a conversation flow that can be suitable for content (ID: 0001) of a designated text (conversation flow in which a designated store ID is set as input information), there are a conversation flow that outputs "sales" of a store corresponding to the store ID as response information, a conversation flow that outputs "budget" of a store corresponding to the store ID as response information, etc. Here, the conversation flow that outputs "sales" as response information is automatically selected among these conversation flows, and a flow-related text "sales" representing content of output information (response information) of the conversation flow is extracted. Then, this flow-related text "sales" is added to the text "ID: 0001 (Tokorozawa store)" designated by the user, and new post information by a combined text "sales of ID: 0001 (Tokorozawa store)" is automatically generated.

The new post information (text "sales of ID: 0001 (Tokorozawa store)") automatically generated by the response information generation unit 22 is immediately transmitted to the chat control apparatus 200 by the post information transmission unit 13 without waiting for an operation on the send button 43 by the user, and displayed on the conversation display area 41 by the display control unit 15. In the chat control apparatus 200, a conversation flow in which a store ID is set as input information and sales is set as output information is selected and executed by the response information generation unit 22 as a conversation flow suitable for the content (sales of ID: 0001 (Tokorozawa store)) of the text of the post information, and a text "1,234,567 yen" is generated as response information. Then, the response information of the text "1,234,567 yen" is returned to the user terminal 100 by the response information return unit 23, and displayed on the conversation display area 41 of the chat screen by the display control unit 15.

Figure 7:
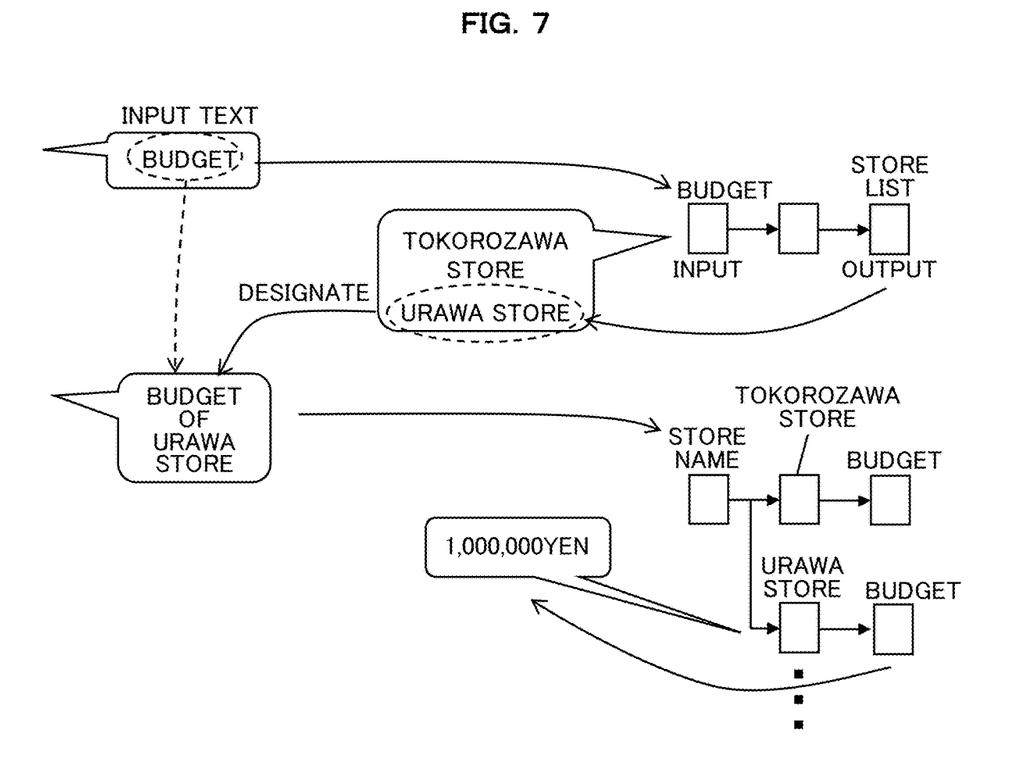
FIG. 7 is a diagram schematically illustrating an operation example of the chat system according to the embodiment.

FIG. 5 and FIG. 6 illustrate an example of generating new post information using a flow-related text related to a conversation flow that can be suitable for content of a text designated by the designation operation reception unit 16. However, information added to the text designated by the designation operation reception unit 16 is not limited to the flow-related text. For example, a text of post information transmitted to the chat control apparatus 200 one time before may be added. FIG. 7 is a diagram schematically illustrating an operation example of the chat system in this case.

In the example illustrated in FIG. 7, at the start of a conversation, the user inputs a text "budget" to the input box 42, and transmits this text as post information to the chat control apparatus 200. In response thereto, the response information generation unit 22 of the chat control apparatus 200 generates response information of the text including two or more options that can be designated by the user according to a conversation flow selected as a conversation flow suitable for content of the post information from a plurality of conversation flows stored in the conversation flow storage unit 20.

That is, the response information generation unit 22 selects and executes a conversation flow in which a text "budget" is set as input information and a store name list is set as output information as a conversation flow suitable for content of a text of post information, thereby generating a plurality of store names (Tokorozawa store and Urawa store) as response information.

The response information of the store name list generated by the response information generation unit 22 (response information of a text including two or more options) is returned to the user terminal 100 by the response information return unit 23, and displayed on the conversation display area 41 of the chat screen by the display control unit 15. The user can select and designate a desired store name from the store name list (options) displayed as response information on the conversation display area 41. In the example of FIG. 7, the user designates "Urawa store".

The post information generation unit 12 adds a text designated from options by the designation operation reception unit 16 to a text of post information transmitted to the chat control apparatus 200 one time before, thereby automatically generating new post information. In the example of FIG. 7, the text "Urawa store" designated by the user is added to the text "budget" of the post information transmitted to the chat control apparatus 200 one time before, thereby automatically generating new post information of a combined text "budget of Urawa store".

The new post information (text "budget of Urawa store") automatically generated by the response information generation unit 22 is immediately transmitted to the chat control apparatus 200 by the post information transmission unit 13 without waiting for an operation on the send button 43 by the user, and displayed on the conversation display area 41 by the display control unit 15. In the chat control apparatus 200, a branched conversation flow in which a store name is set as input information and budget is set as output information is selected and executed by the response information generation unit 22 as a conversation flow suitable for the content (budget of Urawa store) of the text of the post information, and a text "1,000,000 yen" is generated as response information. Then, the response information of the text "1,000,000 yen" is returned to the user terminal 100 by the response information return unit 23, and displayed on the conversation display area 41 of the chat screen by the display control unit 15.

Figure 8:
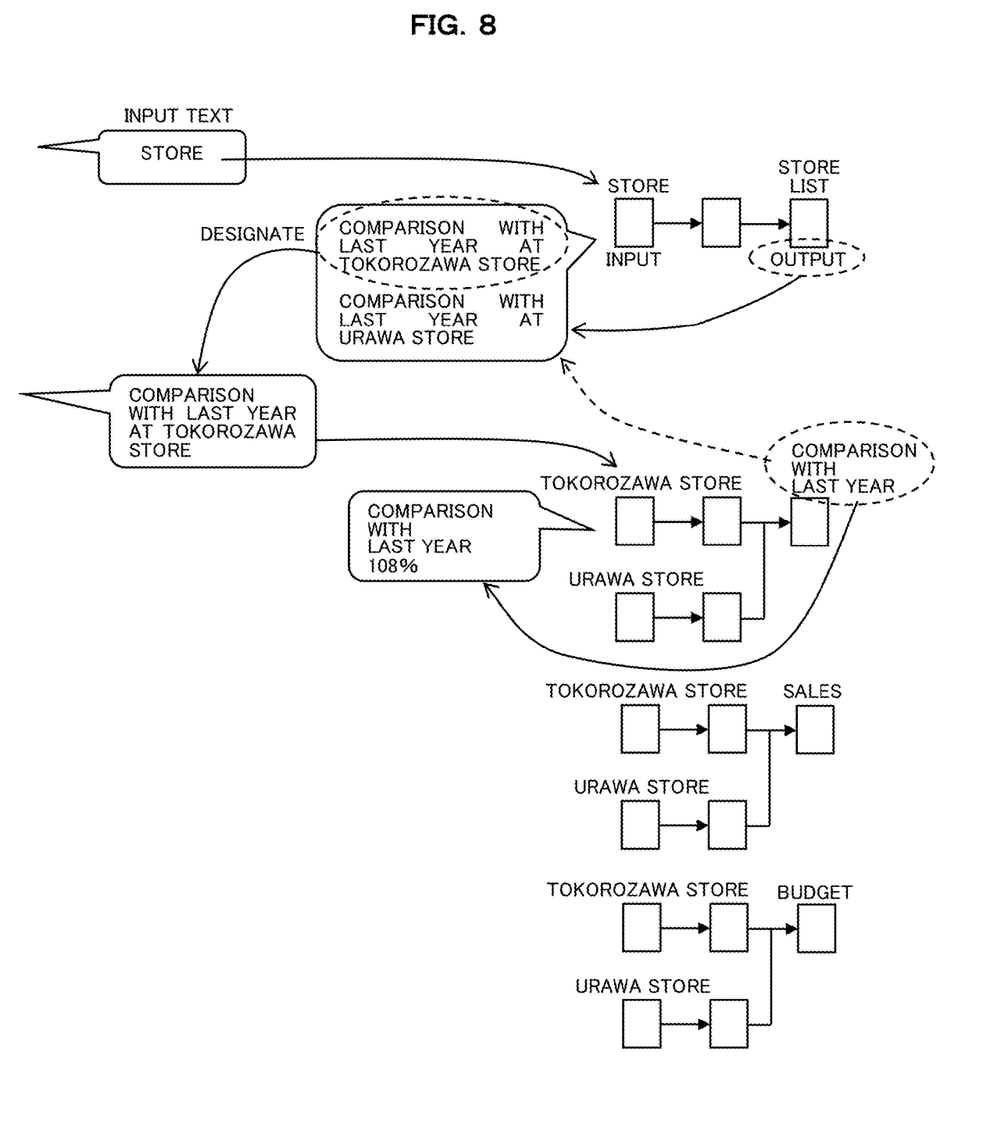
FIG. 8 is a diagram schematically illustrating an operation example of the chat system according to the embodiment.

FIGS. 5 to 7 illustrate an example of generating new post information by adding another text to a text designated by the designation operation reception unit 16. However, the invention is not limited thereto. For example, response information may be generated by adding another text to a text of output information of a conversation flow selected and executed by the response information generation unit 22. FIG. 8 is a diagram schematically illustrating an operation example of the chat system in this case.

For example, the response information generation unit 22 generates two or more texts according to a conversation flow selected as a conversation flow suitable for content of post information from a plurality of conversation flows stored in the conversation flow storage unit 20, and adds a flow-related text related to a conversation flow that can be suitable for content of the generated texts to each of the two or more texts, thereby generating response information of a combined text including two or more options that can be designated by the user.

In an example illustrated in FIG. 8, at the start of a conversation, the user inputs a text "store" to the input box 42 and transmits this text as post information to the chat control apparatus 200. In response thereto, the response information generation unit 22 of the chat control apparatus 200 selects and executes a conversation flow in which a text "store" is set as input information and store name list is set as output information as a conversation flow suitable for content of the text of the post information, thereby generating a text of a plurality of store names (Tokorozawa store and Urawa store).

Furthermore, the response information generation unit 22 adds a flow-related text related to a conversation flow that can be suitable for content of the generated text to each of two or more texts, thereby generating response information of a combined text including two or more options that can be designated by the user. In the example of FIG. 8, as a conversation flow that can be suitable for content (Tokorozawa store and Urawa store) of a designated text (conversation flow in which a generated store name is set as input information), there are a conversation flow that outputs "comparison with last year" of the store as response information, a conversation flow that outputs "sales" of the store as response information, a conversation flow that outputs "budget" of the store as response information, etc. Here, the conversation flow that outputs "comparison with last year" as response information is automatically selected from these conversation flows, and the flow-related text "comparison with last year" is added to each of texts "Tokorozawa store" and "Urawa store" generated by executing the conversation flow, thereby generating response information of a combined text including two or more options of "comparison with last year at Tokorozawa store" and "comparison with last year at Urawa store".

The response information of the text including two or more options generated by the response information generation unit 22 is returned to the user terminal 100 by the response information return unit 23, and displayed on the conversation display area 41 of the chat screen by the display control unit 15. The user can select and designate a desired text from among options displayed on the conversation display area 41 as response information. In the example of FIG. 8, the user designates "comparison with last year at Tokorozawa store".

The post information generation unit 12 automatically generates a combined text designated from the options by the designation operation reception unit 16 as new post information. That is, in the example of FIG. 8, the text "comparison with last year at Tokorozawa store" designated by the user is set as new post information. The new post information (text "comparison with last year at Tokorozawa store") automatically generated by the response information generation unit 22 is immediately transmitted to the chat control apparatus 200 by the post information transmission unit 13 without waiting for an operation on the send button 43 by the user, and displayed on the conversation display area 41 by the display control unit 15.

In the chat control apparatus 200, a conversation flow suitable for content (comparison with last year at Tokorozawa store) of the text of the post information is selected and executed by the response information generation unit 22, and a text "108% compared with last year" is generated as the response information. Then, the response information of the text "108% compared with last year" is returned to the user terminal 100 by the response information return unit 23, and displayed on the conversation display area 41 of the chat screen by the display control unit 15.

Figure 9:
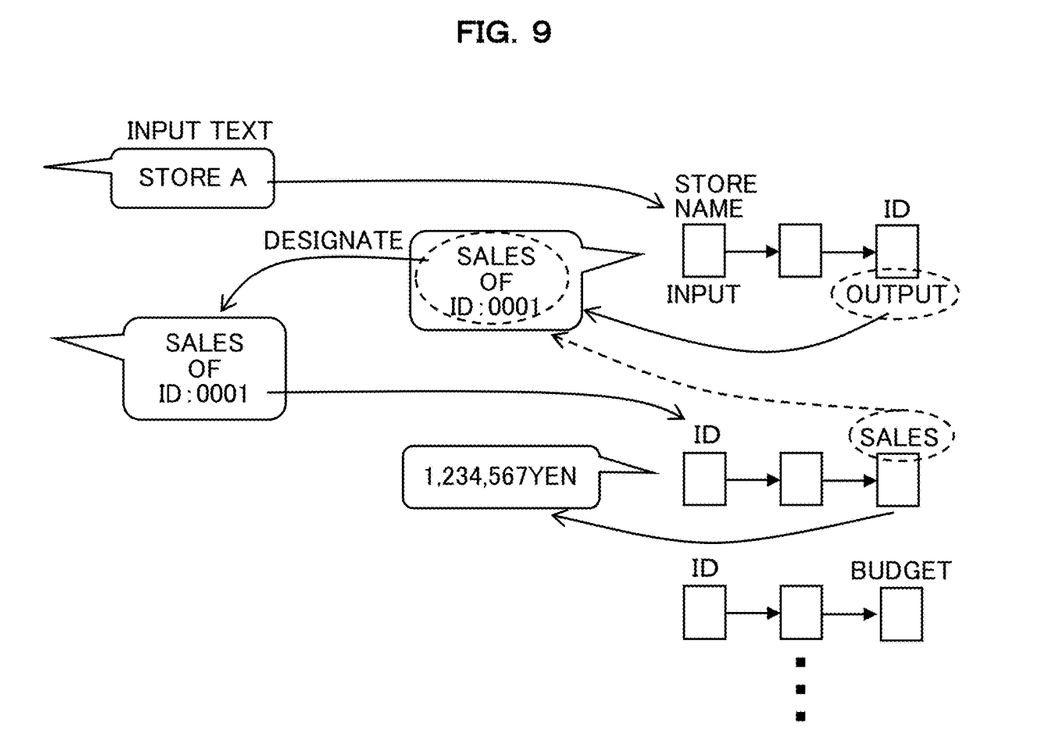
FIG. 9 is a diagram schematically illustrating an operation example of the chat system according to the embodiment.

In the example illustrated in FIG. 8, the response information generation unit 22 generates two or more texts according to a conversation flow selected as a conversation flow suitable for content of post information. However, one text may be generated. FIG. 9 is a diagram schematically illustrating an operation example of the chat system in this case.

In the example illustrated in FIG. 9, the response information generation unit 22 generates one text according to a conversation flow selected as a conversation flow suitable for content of post information from a plurality of conversation flows stored in the conversation flow storage unit 20, and adds a flow-related text related to a conversation flow that can be suitable for content of the generated text to one text, thereby generating response information of a combined text.

In an example illustrated in FIG. 9, at the start of a conversation, the user inputs a text indicating a name of the store A to the input box 42 and transmits this text as post information to the chat control apparatus 200. In response thereto, the response information generation unit 22 of the chat control apparatus 200 selects and executes a conversation flow in which store name is set as input information and store ID is set as output information as a conversation flow suitable for content of the text of the post information, thereby generating a text of the store ID (ID: 0001).

Furthermore, the response information generation unit 22 adds a flow-related text related to a conversation flow that can be suitable for content of the generated text to the one generated text, thereby generating response information of a combined text. In the example of FIG. 9, a conversation flow that outputs "sales" of the store corresponding to the store ID as response information is automatically selected as a conversation flow that can be suitable for the content (ID: 0001) of the generated text (conversation flow in which the generated store ID is set as input information), and the flow-related text "sales" is added to the text "ID: 0001" generated by execution of the conversation flow, thereby generating response information of a combined text "sales of ID: 0001".

The response information of the combined text generated by the response information generation unit 22 is returned to the user terminal 100 by the response information return unit 23, and displayed on the conversation display area 41 of the chat screen by the display control unit 15. The user can designate a text displayed as the response information on the conversation display area 41. The post information generation unit 12 automatically generates the combined text "sales of ID: 0001" designated by the designation operation reception unit 16 as new post information. The new post information (text "sales of ID: 0001") automatically generated by the response information generation unit 22 is immediately transmitted to the chat control apparatus 200 by the post information transmission unit 13 without waiting for an operation on the send button 43 by the user, and displayed on the conversation display area 41 by the display control unit 15.

In the chat control apparatus 200, a conversation flow suitable for the content (sales of ID: 0001) of the text of the post information is selected and executed by the response information generation unit 22, and a text "1,234,567 yen" is generated as response information. Then, the response information of the text "1,234,567 yen" is returned to the user terminal 100 by the response information return unit 23, and displayed on the conversation display area 41 of the chat screen by the display control unit 15.

Note that FIGS. 5 to 9 illustrate an example of ending by a conversation reciprocating twice. However, it is possible to continue a conversation reciprocating three times or more. That is, by performing an operation in which the user designates a text of response information displayed on the conversation display area 41 of the chat screen as a result of a conversation reciprocating twice, it is possible to continue a conversation reciprocating for a third or subsequent time. For example, it is possible to continue a conversation between the user and the chat control apparatus 200 until there is no conversation flow suitable for content of a text of post information among a plurality of conversation flows registered in advance in the conversation flow storage unit 20.

As described in detail above, in the chat system of the present embodiment, in the chat control apparatus 200, a conversation flow suitable for content of a text of post information is selected from a plurality of conversation flows registered in advance based on the post information of the text transmitted from the user terminal 100, and response information of the text is generated according to the selected conversation flow and returned to the user terminal 100. Further, in the user terminal 100, the response information returned from the chat control apparatus 200 is displayed, and when an operation is performed to designate a text of the displayed response information, new post information is automatically generated using the designated text and transmitted to the chat control apparatus 200.

According to the present embodiment configured in this way, in the chat system that executes a conversation between the user and the chat control apparatus 200, when the user performs an operation of designating the response information returned from the chat control apparatus 200 and displayed on the user terminal 100, new post information is automatically generated using a text of the designated response information and transmitted to the chat control apparatus 200, so that the conversation is continued. Therefore, it is possible to avoid inconvenience felt by the user who needs to input all texts of post information one by one each time a conversation reciprocating once is performed between the user and the chat control apparatus 200, and make it easier to chat.

Note that in the embodiment of FIGS. 5 and 6, a description has been given of an example in which when there is a plurality of conversation flows that can be suitable for content of a text designated by the designation operation reception unit 16, the post information generation unit 12 automatically generates post information using a flow-related text related to any one conversation flow automatically selected from the conversation flows. However, the invention is not limited thereto. For example, the post information generation unit 12 may automatically generate post information by adding a plurality of flow-related texts related to a plurality of conversation flows that can be suitable for content of a text designated by the designation operation reception unit 16 to the text designated by the designation operation reception unit 16 under the AND condition or the OR condition that allows the user to designate two or more options.

The AND condition means that the response information generation unit 22 of the chat control apparatus 200 selects and executes a plurality of conversation flows suitable for content of post information. In this example, the response information generation unit 22 of the chat control apparatus 200 selects a plurality of conversation flows suitable for content of a text of post information from among a plurality of conversation flows registered in advance in the conversation flow storage unit 20 based on the post information received by the post information reception unit 21, and generates response information of the text according to the plurality of selected conversation flows.

For example, in the example of FIG. 5, the post information generation unit 12 automatically generates the text "sales and budget of ID: 0001" as post information. The chat control apparatus 200 receiving the post information of such a text executes, as a conversation flow that can be suitable for content (sales and budget of ID: 0001) of the text of the post information, both a conversation flow that outputs "sales" of the store corresponding to the store ID as the response information and a conversation flow that outputs "budget" of the store corresponding to the store ID as the response information in the response information generation unit 22, thereby generating sales and budget of the store corresponding to the store ID as the post information.

The OR condition means that response information having two or more options is generated and supplied to the user by adding each of a plurality of flow-related texts one by one to a text designated by the designation operation reception unit 16. In this case, the post information transmission unit 13 does not automatically transmit the post information generated by the post information generation unit 12 to the chat control apparatus 200. That is, when the display control unit 15 causes the conversation display area 41 or the input box 42 to display post information including options generated by the post information generation unit 12, and the user designates any one of the options and operates the send button 43, post information including a text of the designated option is transmitted to the chat control apparatus 200.

In this example, the response information generation unit 22 of the chat control apparatus 200 selects a conversation flow suitable for content of a text of post information designated from options by the user from a plurality of conversation flows registered in advance in the conversation flow storage unit 20 based on post information received by the post information reception unit 21, and generates response information of the text according to the selected conversation flow.

For example, in the example of FIG. 5, the post information generation unit 12 automatically generates post information of a text having two options, "sales of ID: 0001" and "budget of ID: 0001". The user designates any one of these options. The chat control apparatus 200 executes, as a conversation flow that can be suitable for content of the text of the post information designated by the user, any one of a conversation flow that outputs "sales" of the store corresponding to the store ID as response information or a conversation flow that outputs "budget" of the store corresponding to the store ID as response information in the response information generation unit 22, thereby generating sales or budget of the store corresponding to the store ID as response information.

Further, in the embodiment illustrated in FIG. 8, a description has been given of an example in which when there is a plurality of conversation flows that can be suitable for content of a text generated by execution of one conversation flow, the response information generation unit 22 generates response information of a combined text using a flow-related text related to any one conversation flow automatically selected by the response information generation unit 22 from the conversation flows. However, the invention is not limited thereto. For example, when there is a plurality of conversation flows that can be suitable for content of a text generated by execution of one conversation flow, the response information generation unit 22 may generate response information of a combined text including two or more options that can be designated by the user by adding a plurality of flow-related texts related to the plurality of conversation flows to each of the two or more generated texts under the AND condition or the OR condition that allows the user to designate two or more options.

In the example of FIG. 8, when a flow-related text is added under the AND condition, the response information generation unit 22 adds, to each of a plurality of texts "Tokorozawa store" and "Urawa store" generated by execution of one conversation flow, a plurality of flow-related texts "comparison with last year", "sales", and "budget" related to a plurality of conversation flows that can be suitable for content of the generated texts, thereby generating response information of a combined text including two options of "comparison with last year at Tokorozawa store, sales and budget" and "comparison with last year at Urawa store, sales and budget".

On the other hand, in the example of FIG. 8, when a flow-related text is added under the OR condition, the response information generation unit 22 adds, to each of a plurality of texts "Tokorozawa store" and "Urawa store" generated by execution of one conversation flow, each of a plurality of flow-related texts "comparison with last year", "sales", and "budget" related to a plurality of conversation flows that can be suitable for content of the generated texts one by one, thereby generating response information of a combined text including six options of "comparison with last year at Tokorozawa store", "sales of Tokorozawa store", "budget of Tokorozawa store", "comparison with last year at Urawa store", "sales of Urawa store", and "budget of Urawa store".

Further, in the embodiment illustrated in FIG. 9, a description has been given of an example in which when there is a plurality of conversation flows that can be suitable for content of a text generated by execution of one conversation flow, the response information generation unit 22 generates response information of a combined text using a flow-related text related to any one conversation flow automatically selected from the conversation flows. However, the invention is not limited thereto. For example, when there is a plurality of conversation flows that can be suitable for content of a text generated by execution of one conversation flow, the response information generation unit 22 may generate response information of a combined text by adding each of a plurality of flow-related texts related to the plurality of conversation flows to the one generated text under the AND condition or the OR condition that allows the user to designate two or more options.

In the example of FIG. 9, when a flow-related text is added under the AND condition, the response information generation unit 22 adds, to a text "ID: 0001" generated by execution of one conversation flow, a plurality of flow-related texts "sales" and "budget" related to a plurality of conversation flows that can be suitable for content of the generated texts, thereby generating response information of a combined text "sales and budget of ID: 0001".

On the other hand, in the example of FIG. 9, when a flow-related text is added under the OR condition, the response information generation unit 22 adds, to a text "ID: 0001" generated by execution of one conversation flow, each of a plurality of flow-related texts "sales" and "budget" related to a plurality of conversation flows that can be suitable for content of the generated texts one by one, thereby generating response information of a combined text including two options of "sales of ID: 0001" and "budget of ID: 0001".

Further, in the embodiment, a description has been given of an example in which the post information transmission unit 13 automatically transmits post information generated by the post information generation unit 12 to the chat control apparatus 200 without waiting for a user operation for transmission instruction (operation on the send button 43). However, the invention is not limited thereto. For example, the display control unit 15 may display post information generated by the post information generation unit 12 in a state of being input to the input box 42, and the post information transmission unit may wait for a user operation for transmission instruction in the state where the post information is input to the input box 42, and transmit the post information to the chat control apparatus 200 when the user operation for transmission instruction is performed.

When using this configuration, in a case where post information generated by the post information generation unit 12 and input to the input box 42 is different from desired content, when the send button 43 is operated after editing a part of a text, post information including an edited text may be transmitted to the chat control apparatus 200. In this case, an operation occurs in which the user inputs the part of the text to the input box 42. However, when compared to a case where all the text of the post information is input, it is possible to reduce inconvenience of inputting the text and easily chat.

Further, new post information by a combined text may be generated by the display control unit 15 displaying a text designated by the designation operation reception unit 16 in a state of being input to the input box 42, and the post information generation unit 12 waiting in the state where the designated text is input to the input box 42, and then adding a text based on an input operation received by the input operation reception unit 11 to the text designated by the designation operation reception unit 16 (text input to the input box 42).

For example, in the example illustrated in FIG. 5, when the user performs an operation to designate response information of "ID: 0001" displayed on the conversation display area 41 of the chat screen, a text "ID: 0001" is displayed in the input box 42 to be in a standby state. Thereafter, for example, when the user additionally inputs a text "sales of" in the input box 42 and presses the send button 43, post information of a text "sales of ID: 0001" is transmitted to the chat control apparatus 200. In this case, an operation occurs in which the user inputs a part of the text to the input box 42. However, when compared to a case where all the text of the post information is input, it is possible to reduce inconvenience of inputting the text and easily chat.

In addition, the embodiment described above is merely an example of materialization in carrying out the invention, and the technical scope of the invention should not be construed in a limited manner by this embodiment. That is, the invention can be implemented in various forms without departing from the gist or main features.

What is claimed is:

1. A chat system for executing a conversation between a user and a computer, the chat system comprising:
a user terminal used by the user; and
a chat control apparatus that controls execution of the conversation,
wherein the chat control apparatus includes
a post information reception unit that receives post information of a text transmitted from the user terminal,
a response information generation unit that selects a conversation flow suitable for content of a text of the post information from a plurality of conversation flows registered in advance based on the post information received by the post information reception unit, and generates response information of the text according to the selected conversation flow, and
a response information return unit that returns the response information generated by the response information generation unit to the user terminal, and
the user terminal includes
a display control unit that displays the post information transmitted to the chat control apparatus and the response information returned from the chat control apparatus,
a designation operation reception unit that receives an operation of designating a text of the response information displayed by the display control unit,
a post information generation unit that generates new post information using the text designated based on the operation received by the designation operation reception unit,
a post information transmission unit that transmits the post information generated by the post information generation unit to the chat control apparatus, and
a response information reception unit that receives the response information returned from the chat control apparatus.

2. The chat system according to claim 1, wherein the post information generation unit adds a flow-related text related to a conversation flow having a possibility of being suitable for content of a text designated by the designation operation reception unit among the plurality of conversation flows to the text designated by the designation operation reception unit, thereby automatically generating the new post information by a combined text.

3. The chat system according to claim 2,
wherein the response information generation unit generates response information of the text including two or more options allowed to be designated by the user according to the selected conversation flow, and
the post information generation unit adds a flow-related text related to a conversation flow having a possibility of being suitable for content of a text designated from the options by the designation operation reception unit to a text designated from the options, thereby automatically generating the new post information by a combined text.

4. The chat system according to claim 1,
wherein the response information generation unit generates response information of the text including two or more options allowed to be designated by the user according to the selected conversation flow, and
the post information generation unit adds a text designated from the options by the designation operation reception unit to a text of post information transmitted to the chat control apparatus one time before, thereby automatically generating the new post information by a combined text.

5. The chat system according to claim 1,
wherein the response information generation unit generates two or more texts according to the selected conversation flow, and adds a flow-related text related to a conversation flow having a possibility of being suitable for content of the generated text to each of the two or more texts, thereby generating response information of a combined text including two or more options allowed to be designated by the user, and
the post information generation unit uses a combined text designated from the options by the designation operation reception unit as the new post information.

6. The chat system according to claim 1,
wherein the response information generation unit generates one text according to the selected conversation flow, and adds a flow-related text related to a conversation flow having a possibility of being suitable for content of the generated text to the one text, thereby generating response information of a combined text, and
the post information generation unit uses a combined text designated by the designation operation reception unit as the new post information.

7. The chat system according to claim 2, wherein when there is a plurality of conversation flows having a possibility of being suitable for content of a text designated by the designation operation reception unit, the post information generation unit automatically generates the post information using a flow-related text related to any one automatically selected conversation flow.

8. The chat system according to claim 2,
wherein when there is a plurality of conversation flows having a possibility of being suitable for content of a text designated by the designation operation reception unit, the post information generation unit adds a plurality of flow-related texts related to the plurality of conversation flows to the text designated by the designation operation reception unit under an AND condition, thereby automatically generating the post information, and
the response information generation unit selects a plurality of conversation flows suitable for content of a text of the post information from a plurality of conversation flows registered in advance based on the post information received by the post information reception unit, and generates response information of the text according to the plurality of selected conversation flows.

9. The chat system according to claim 2,
wherein when there is a plurality of conversation flows having a possibility of being suitable for content of a text designated by the designation operation reception unit, the post information generation unit adds a plurality of flow-related texts related to the plurality of conversation flows to the text designated by the designation operation reception unit under an OR condition that allows the user to designate two or more options, thereby automatically generating the post information, and
the response information generation unit selects a plurality of conversation flows suitable for content of a text of the post information from a plurality of conversation flows registered in advance based on the post information received by the post information reception unit, and generates response information of the text according to the plurality of selected conversation flows.

10. The chat system according to claim 5, wherein when there is a plurality of conversation flows having a possibility of being suitable for content of the generated text, the response information generation unit generates response information of the combined text using a flow-related text related to any one automatically selected conversation flow.

11. The chat system according to claim 5, wherein where there is a plurality of conversation flows having a possibility of being suitable for content of the generated text, the response information generation unit adds a plurality of flow-related texts related to the plurality of conversation flows to each of the two or more generated texts under an AND condition or an OR condition that allows the user to designate two or more options, thereby generating response information of a combined text including the two or more options allowed to be designated by the user.

12. The chat system according to claim 6, wherein where there is a plurality of conversation flows having a possibility of being suitable for content of the generated text, the response information generation unit adds a plurality of flow-related texts related to the plurality of conversation flows to the generated text under an AND condition or an OR condition that allows the user to designate two or more options, thereby generating response information of a combined text.

13. The chat system according to claim 1, wherein the post information transmission unit automatically transmits the post information generated by the post information generation unit to the chat control apparatus without waiting for a user operation for transmission instruction.

14. The chat system according to claim 1,
wherein
the user terminal further includes an input operation reception unit that receives an operation of inputting a text of the post information to a predetermined input box, and
the post information transmission unit waits for a user operation for transmission instruction in a state where a text of the post information generated by the post information generation unit is input to the predetermined input box, and transmits the post information to the chat control apparatus when the user operation for transmission instruction is performed.

15. The chat system according to claim 1,
wherein
the user terminal further includes an input operation reception unit that receives an operation of inputting a text of the post information to a predetermined input box, and
the post information generation unit waits in a state where a text designated by the designation operation reception unit is input to the predetermined input box, and adds a text based on an operation received by the input operation reception unit to the text designated by the designation operation reception unit, thereby generating the new post information.

16. The chat system according to claim 1,
wherein
the user terminal further includes an input operation reception unit that receives an operation of inputting a text of the post information to a predetermined input box, and
the post information transmission unit transmits the post information input based on an operation received by the input operation reception unit or the post information generated by the post information generation unit to the chat control apparatus.

17. A chat control apparatus used for the chat system according to claim 1.

18. A chat program installed in the user terminal used for the chat system according to claim 1 to cause a computer of the user terminal to function as the display control unit, the designation operation reception unit, the post information generation unit, the post information transmission unit, and the response information reception unit.

19. The chat system according to claim 3, wherein when there is a plurality of conversation flows having a possibility of being suitable for content of a text designated by the designation operation reception unit, the post information generation unit automatically generates the post information using a flow-related text related to any one automatically selected conversation flow.

20. The chat system according to claim 3,
wherein when there is a plurality of conversation flows having a possibility of being suitable for content of a text designated by the designation operation reception unit, the post information generation unit adds a plurality of flow-related texts related to the plurality of conversation flows to the text designated by the designation operation reception unit under an AND condition, thereby automatically generating the post information, and
the response information generation unit selects a plurality of conversation flows suitable for content of a text of the post information from a plurality of conversation flows registered in advance based on the post information received by the post information reception unit, and generates response information of the text according to the plurality of selected conversation flows.

21. The chat system according to claim 3, wherein when there is a plurality of conversation flows having a possibility of being suitable for content of a text designated by the designation operation reception unit, the post information generation unit adds a plurality of flow-related texts related to the plurality of conversation flows to the text designated by the designation operation reception unit under an OR condition that allows the user to designate two or more options, thereby automatically generating the post information, and the response information generation unit selects a plurality of conversation flows suitable for content of a text of the post information from a plurality of conversation flows registered in advance based on the post information received by the post information reception unit, and generates response information of the text according to the plurality of selected conversation flows.

22. The chat system according to claim 6, wherein when there is a plurality of conversation flows having a possibility of being suitable for content of the generated text, the response information generation unit generates response information of the combined text using a flow-related text related to any one automatically selected conversation flow.

* * * * *